(12) United States Patent
Matsushita et al.

(10) Patent No.: US 7,676,615 B2
(45) Date of Patent: Mar. 9, 2010

(54) CONTENTS DATA STORAGE DEVICE AND CONTENTS DATA UPDATE SYSTEM

(75) Inventors: Hitomi Matsushita, Osaka (JP); Yoshihiro Nishikawa, Osaka (JP); Masami Yasui, Nara (JP); Toshikazu Murai, Osaka (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 11/841,229

(22) Filed: Aug. 20, 2007

(65) Prior Publication Data

US 2008/0222314 A1    Sep. 11, 2008

(30) Foreign Application Priority Data

Aug. 21, 2006    (JP)    ............................. 2006-223814

(51) Int. Cl.
 G06F 13/12    (2006.01)
 G06F 12/00    (2006.01)
(52) U.S. Cl. ..................... 710/74; 710/33; 709/217; 711/141; 707/200
(58) Field of Classification Search ............. 710/72–74, 710/33; 711/141; 709/217–219; 707/200; 705/50
See application file for complete search history.

(56) References Cited

U.S. PATENT DOCUMENTS 7,181,628 B2*    2/2007    Sato et al. .................. 713/189

| | | | |
|---|---|---|---|
| 2002/0194474 A1* | 12/2002 | Natsuno et al. | 713/168 |
| 2003/0079038 A1 | 4/2003 | Robbin et al. | |
| 2003/0110213 A1* | 6/2003 | Munetsugu et al. | 709/203 |
| 2003/0167318 A1 | 9/2003 | Robbin et al. | |
| 2006/0168340 A1 | 7/2006 | Heller et al. | |
| 2007/0088659 A1* | 4/2007 | Phillips | 705/51 |
| 2007/0239722 A1* | 10/2007 | Phillips | 707/9 |
| 2008/0162666 A1* | 7/2008 | Ebihara et al. | 709/217 |

FOREIGN PATENT DOCUMENTS

| JP | 2005-507130 | 3/2005 |
|---|---|---|
| JP | 2005-533333 | 11/2005 |

\* cited by examiner

*Primary Examiner*—Christopher B Shin
(74) *Attorney, Agent, or Firm*—Hamre, Schumann, Mueller & Larson, P.C.

(57) ABSTRACT

A content data storage apparatus that enables content data on a plurality of client apparatuses to be individually updated according to the preferences or the like of users. Content data on a memory card is stored in association with client content management information for managing the content data and client content identification information for identifying the content data in management units. When client content identification information stored on a memory card connected to an input/output unit matches any storage content identification information stored on a hard disk, a control unit updates the content data of the memory card based on content data included in management units identified by this storage content identification information.

10 Claims, 8 Drawing Sheets

Playlist selection

New tracks
Favorite tracks
Artist A
My best collection
For commuting
Relaxing music
Uplifting music
Summer songs
⋮

FIG. 7B

Track order option selection

In registered order
Most recent first
Random

FIG. 7C

Playback duration option selection 30 min
60 min
90 min
120 min
Unlimited

CONTENTS DATA STORAGE DEVICE AND CONTENTS DATA UPDATE SYSTEM

BACKGROUND OF THE INVENTION

1. Field of the Invention

The present invention relates to a content data storage apparatus that is able to select content from storage content data and easily rewrite the content data of a memory card, an external memory or the like, and to a content data update system that uses the content data storage apparatus.

2. Description of Related Art

Conventional content data update systems hold information on selected playlists, and update content data on a memory card, a hard disk or a portable audio player with built-in semiconductor memory, based on this information (e.g., see JP 2005-533333A).

However, with this conventional configuration, since only one type of information for updating playlists is held on a host audio device that is a content data storage apparatus, it is impossible to set individually the updating of a plurality of memory cards or external memories. For example, in the case where the host audio device is shared by a family, memory cards or external memories cannot be updated individually according to the preferences of each family member.

SUMMARY OF THE INVENTION

An object of the present invention is to provide a content data storage apparatus that enables content data on a plurality of client apparatuses to be updated individually by a single content data storage apparatus according to the preferences of users of the individual client apparatuses, and to a content data update system that uses the content data storage apparatus.

To achieve the above object, a content data storage apparatus according to the present invention for storing content data, and updating content data on a client apparatus based on the stored content data, includes a storage content storage medium capable of storing plural groupings of content data in association with storage content management information for managing a set of the content data and storage content identification information for identifying the content data in management units, an input/output unit that performs data input/output with the client apparatus, and a control unit that updates the content data of the client apparatus. The content data of the client apparatus is stored on the client apparatus in association with client content management information for managing the content data and client content identification information for identifying the content data in management units, and the control unit acquires the client content identification information of content data in one or a plurality of management units specified for updating out of the content data of a client apparatus connected to the input/output unit, and, if storage content identification information matching the acquired client content identification information is stored in the storage content storage medium, updates the content data of the client apparatus based on content data included in management units identified by the storage content identification information that matches the client content identification information.

With the content data storage apparatus of the present invention according to the above configuration, the content data of the client apparatus is updated, based on content data included in management units identified by storage content identification information that matches the client content identification information of content data in one or a plurality of management units specified for updating. Content data thus can be updated individually for each client apparatus.

To achieve the above object, a content data update system according to the present invention includes a client apparatus that uses content data, and a content data storage apparatus that updates the content data of the client apparatus based on stored content data. The content data storage apparatus has a storage content storage medium capable of storing plural groupings of content data in association with storage content management information for managing a set of the content data and storage content identification information for identifying the content data in management units, an input/output unit that performs data input/output with the client apparatus, and a control unit that updates the content data of the client apparatus, and the client apparatus has a client content storage medium that stores content data used by the client apparatus in association with client content management information for managing the content data and client content identification information for identifying the content data in management units. The control unit of the content data storage apparatus acquires the client content identification information of content data in one or a plurality of management units specified for updating out of the content data of a client apparatus connected to the input/output unit, and, if storage content identification information matching the acquired client content identification information is stored in the storage content storage medium, updates the content data of the client apparatus based on content data included in management units identified by the storage content identification information that matches the client content identification information.

With the content data update system of the present invention according to the above configuration, the content data of the client apparatus is updated, based on content data included in management units identified by storage content identification information that matches the client content identification information of content data in one or a plurality of management units specified for updating. Content data thus can be updated individually for each client apparatus.

DETAILED DESCRIPTION OF THE INVENTION

The present invention is able to provide a content data storage apparatus that enables content data on a plurality of client apparatuses to be updated individually by a single content data storage apparatus according to the preferences or the like of users of the individual client apparatuses, and to a content data update system that uses the content data storage apparatus.

In the content data storage apparatus according to the present invention, preferably update information that includes the client content identification information of content data in one or a plurality of management units specified for updating out of the content data of a client apparatus is held in the client apparatus, and the control unit acquires the client content identification information included in the update information from a client apparatus connected to the input/output unit, via the input/output unit. Alternatively, the content data storage apparatus may further include an update information storage unit that stores update information that includes the client content identification information of content data in one or a plurality of management units specified for updating out of the content data of a client apparatus, and an identifier unique to the client apparatus using the content data, and the control unit may acquire the identifier of a client apparatus connected to the input/output unit from the client apparatus via the input/output unit, and acquire the client content identification information corresponding to the acquired identifier from the update information storage unit.

Also, in the content data storage apparatus according to the present invention, preferably the update information further includes an update condition of content data in one or a plurality of management units specified for updating, and the control unit updates the content data of the client apparatus, based on content data included in management units identified by the storage content identification information that matches the client content identification information, and the update condition. It is thus possible to reflect only content data in a range that meets set update conditions, out of the content data stored on the content data storage apparatus, in the content data of a client apparatus. This configuration is effective as a means for only reflecting content data that accords to the desires of the user in the client apparatus, particularly in the case where content data is stored automatically on the content data storage apparatus.

The content data storage apparatus according to the present invention preferably further includes an operation input unit for allowing a user to set the update information. Update information may be set by allowing the user to select from prescribed alternatives, or by user input of arbitrary text, numbers or the like.

If, in the content data storage apparatus according to the present invention, content data in a plurality of management units is specified as content data for updating, the control unit may update the content data of the client apparatus, based on a sum set of content data in a plurality of management units identified by storage content identification information that matches the client content identification information of the content data in the plurality of management units. Alternatively, if content data in a plurality of management units is specified as content data for updating, the control unit may update the content data of the client apparatus, based on a product set of content data in a plurality of management units identified by storage content identification information that matches the client content identification information of the content data in the plurality of management units.

If, in the content data storage apparatus according to the present invention, there is content data in the client content management information that is not included in the storage content management information and not stored in the storage content storage medium, preferably the control unit maintains the content data without deletion from the client apparatus. This configuration enables prevention of the loss of content data that possibly only exists on the client apparatus.

Hereinafter, a specific embodiment of the present invention will be described with reference to the drawings.

Figure 1:
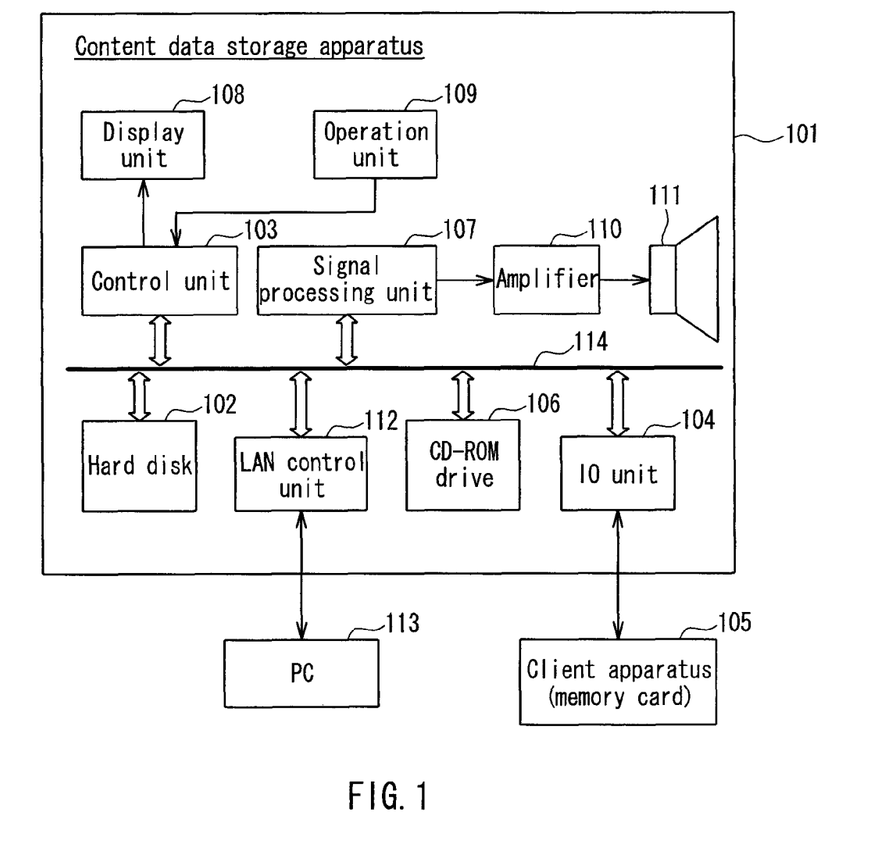
FIG. 1 is a configuration diagram of a content data update system in a first embodiment of the present invention.

FIG. 1 is a block diagram showing the configuration of a content data update system according to an embodiment of the present invention. The content data update system shown in FIG. 1 is constituted by a content data storage apparatus 101 and a memory card 105 as a client apparatus. In the present embodiment, the content data storage apparatus 101 is an audio device such as mini-component audio system, for example. The memory card 105 as a client apparatus is used as a storage medium of a portable audio player. That is, with the content data update system shown in FIG. 1, the user acquires content from a CD-ROM or a music distribution server that can be connected via the Internet or the like, and stores the acquired content on a hard disk 102 in the content data storage apparatus 101. Then when the user removes the memory card 105 of the portable audio player and inserts it in the content data storage apparatus 101, content data stored on the hard disk 102 is reflected on the memory card 105.

Note that an example is given in the present embodiment in which the content data is music data, although the content data is not limited to music data. For example, the present invention can be applied to systems that update various content data including photographs, moving images and electronic books, for example.

Hereinafter, the configuration and operations of the content data update system according to the present embodiment will be described in detail with reference to the drawings.

The content data storage apparatus 101 includes the hard disk 102, a control unit 103, an input/output (IO) unit 104, a CD-ROM drive 106, a signal processing unit 107, a display unit 108, an operation unit 109, an amplifier 110, a speaker 111, and a LAN control unit 112. The hard disk 102, the control unit 103, the IO unit 104, the CD-ROM drive 106, the signal processing unit 107, and the LAN control unit 112 are connected to each other via a bus 114.

The control unit 103 stores music data read from the CD-ROM drive 106 to the hard disk 102. The control unit 103 also controls the display unit 108. The IO unit 104, as an interface with the memory card 105, controls input and output from and to the memory card 105. The operation unit 109 receives external operation information and conveys the received information to the control unit 103.

The LAN control unit 112 accesses a personal computer (PC) 113 and reads content data on the PC 113. The LAN control unit 112 also is able to access an external content server directly without the mediation of the PC 113 and download content data via a network (not shown).

The signal processing unit 107 performs signal processing on content data on the hard disk 102 and music data read from the CD-ROM drive 106. The amplifier 110 amplifies signals processed by the signal processing unit 107 and outputs the amplified signals to the speaker 111. The speaker 111 outputs signals amplified by the amplifier 110 as sound.

The control unit 103 has (1) a function of causing a user to specify content data for updating on the memory card 105, and setting update conditions for updating the specified content data, and (2) a function of updating the content data for updating on the memory card 105 based on the update conditions. The control unit 103 therefore includes an update information setting unit 204 for realizing the above function (1) and an update execution unit 205 for realizing the above function (2), as shown in FIG. 2.

Note that in the present embodiment, track data as content data is managed using playlists (storage content management information, client content management information) in the content data storage apparatus 101 and the memory card 105. Playlists may be organized by the provider in album units, for example, on a CD-ROM or when distributed from a music distribution server or the like. Users also can create their own playlists freely by combining track data stored on the hard disk 102 of the content data storage apparatus 101 according to their own preferences. Further, users also are able to set the playlist names (storage content identification information, client content identification information) of created playlists arbitrarily by operating the operation unit 109. For example, a user may attach playlist names such as "Classic" or "Rock" expressing the genre of the music to create playlists by genre. Alternatively, playlists may be created by situation with playlist names such as "Wake Up" "Jogging" or "Relax", for example, or by artist with the names of artists as playlist names. Further, if the content data storage apparatus 101 is shared by a family, family members may use their own name in the playlist name to distinguish their playlists from the playlists of other members of the family. Users also are able to specify the playback order of track data in playlists.

Storage media such as mass-storage flash memory or rewritable DVD or BD may be used instead of the hard disk 102. Although an example is given in FIG. 1 and the following description in which the memory card 105 removed from a portable audio player is the client apparatus, a configuration in which the portable audio player itself is connected to the content data storage apparatus 101 as a client apparatus is also possible. The IO unit 104 to which client apparatuses are connected is a connection interface such as a memory card slot or a USB, depending on the form of the client apparatus to be connected. The IO unit 104 and a client apparatus also may be connected by a wireless connection.

Figure 2:
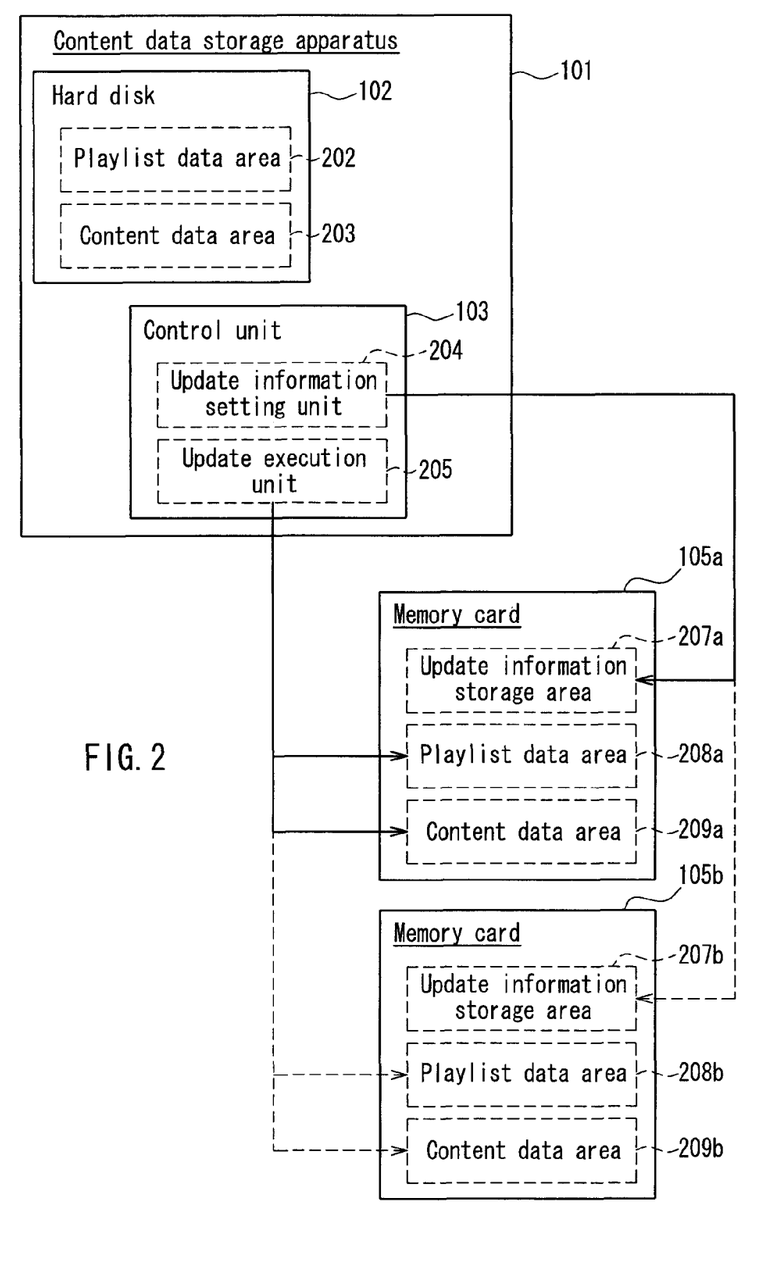
FIG. 2 shows data storage areas in the content data update system.

FIG. 2 is a block diagram showing data storage areas in the content data update system of the present embodiment. In FIG. 2, reference numerals such as memory card 105a and 105b are assigned in order to individually identify a plurality of memory cards used as client apparatuses. In the content data storage apparatus 101, the hard disk 102 has a playlist data area 202 for storing playlist data and a content data area 203 for storing content data.

On the other hand, the semiconductor memory of the memory card 105a as a client apparatus has an update information storage area 207a, a playlist data area 208a, and a content data area 209a. The update information storage area 207a stores as "update information" playlist names for identifying playlists for updating, and update conditions (e.g., track order option, playback duration option) relating to content for updating set by the update information setting unit 204. The playlist data area 208a is for storing playlist data, and the content data area 209a is for storing content data. The memory card 105b similarly has an update information storage area 207b, a playlist data area 208b, and a content data area 209b for use by the memory card 105b.

Figure 3:
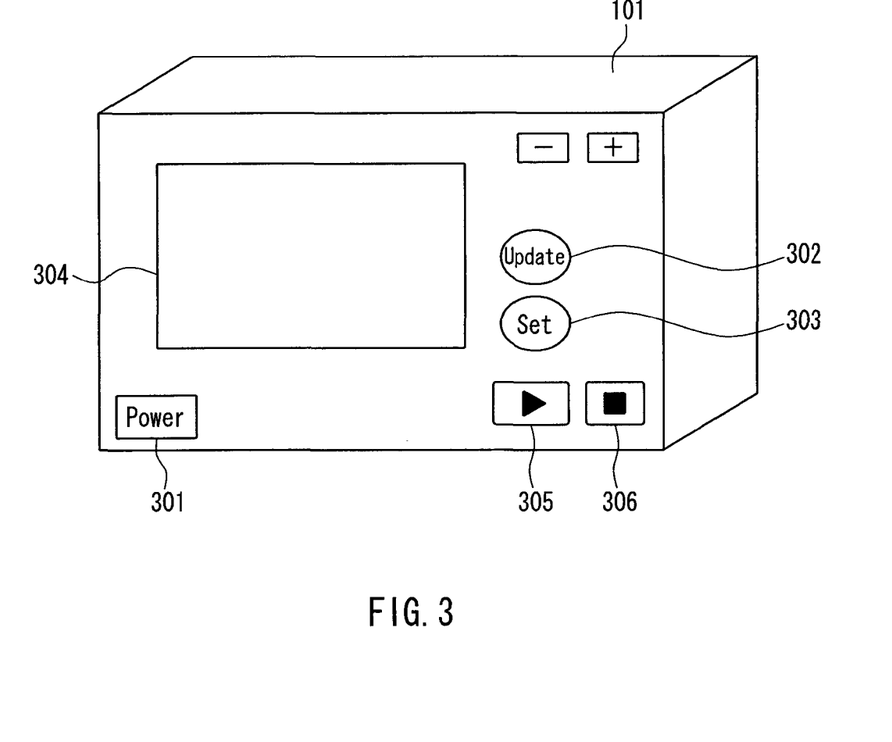
FIG. 3 shows the operation panel of a content data storage apparatus in the content data update system.

FIG. 3 shows an exemplary operation panel of the content data storage apparatus 101. The operation panel is provided with a display 304 that displays update information settings, update execution states and the like, an update execution switch 302, and an update information setting switch 303, in addition to common operation switches for an audio apparatus, such as a power switch 301, a play switch 305 and a stop switch 306. Note that the configuration of the operation panel in FIG. 3 is merely by way of example. For example, a configuration in which the display 304 is a touch panel and the above switches are provided on the touch panel is also possible.

Here, the content data updating operation will be described using FIG. 1 to 3. When a CD-ROM is loaded in the CD-ROM drive 106, the control unit 103 stores music data (content data) read from the CD-ROM in the content data area 203 of the hard disk 102. At this time, the control unit 103 generates playlist data for grouping and managing the music data read from the CD-ROM, based on information registered in the CD-ROM or information input by the user via the operation unit 109, and stores the generated playlist data in the playlist data area 202 of the hard disk 102 in association with the read music data.

Music data on the PC 113 also can be read by the LAN control unit 112 and stored on the hard disk 102. At this time, the music data and playlist data are also respectively stored in the playlist data area 202 and the content data area 203 of the content data storage apparatus 101.

While the storage of content data to the hard disk 102, involving content data being read from a CD-ROM or downloaded from a music distribution server or the like, may be performed manually by the user, the storage of content data to the hard disk 102 also may be performed automatically through automatic distribution from a music distribution server or the like.

If the user wants to set new update information on the memory card 105a, he or she can load the memory card 105a in the IO unit 104 and operate the update information setting switch 303. Then, once the user has set the update information via the operation unit 109, the update information set by the user is written to the update information storage area 207a of the memory card 105a by the update information setting unit 204. Also, at this time, the user is able to select a playlist name to be stored in the memory card 105a from the playlist names of content data already stored on the content data storage apparatus 101. The selected playlist name is stored in the update information storage area 207a of the memory card 105a as a playlist name for updating. Note that the procedures of these operations will be described in detail below.

Then, when the user loads the memory card 105a in the IO unit 104 and operates the update execution switch 302, the update execution unit 205 checks whether the same playlist name as the playlist name for updating stored in the update information storage area 207a of the memory card 105a exists in the playlist data area 202 of the content data storage apparatus 101. If the same playlist name exists, the update execution unit 205 extracts content data for use in updating from this playlist in accordance with update conditions (described below) stored in the update information storage area 207a, and updates the playlist data area 208a and the content data area 209a of the memory card 105a.

Note that the above configuration and operations apply similarly to the memory card 105b. That is, when the user loads the memory card 105b in the IO unit 104 and operates the update execution switch 302, the update execution unit 205 checks whether the same playlist name as the playlist name for updating stored in the update information storage area 207b of the memory card 105b exists in the playlist data area 202 of the content data storage apparatus 101. If the same playlist name exists, the update execution unit 205 extracts content data for use in updating from this playlist in accordance with update conditions stored in the update information storage area 207b, and updates the playlist data area 208b and the content data area 209b of the memory card 105b.

Consequently, according to the content data update system of the present embodiment, the update execution unit 205 of the content data storage apparatus 101 is able to distinguish playlists for updating on each memory card, based on the update information stored in the update information storage area 207, as a result of users setting update information for each of the plurality of memory cards 105a and 105b. For example, if the playlist name for updating on the memory card 105a is "Classic", and the playlist name for updating on the memory card 105b is "Rock", the content data of the memory card 105a is updated based on the playlist entitled "Classic" stored in the content data storage apparatus 101, while the content data of the memory card 105b is updated based on the playlist entitled "Rock" stored in the content data storage apparatus 101. The present embodiment thereby enables the content data on each of a plurality of memory cards to be updated individually according to the preferences of the user.

Figure 4:
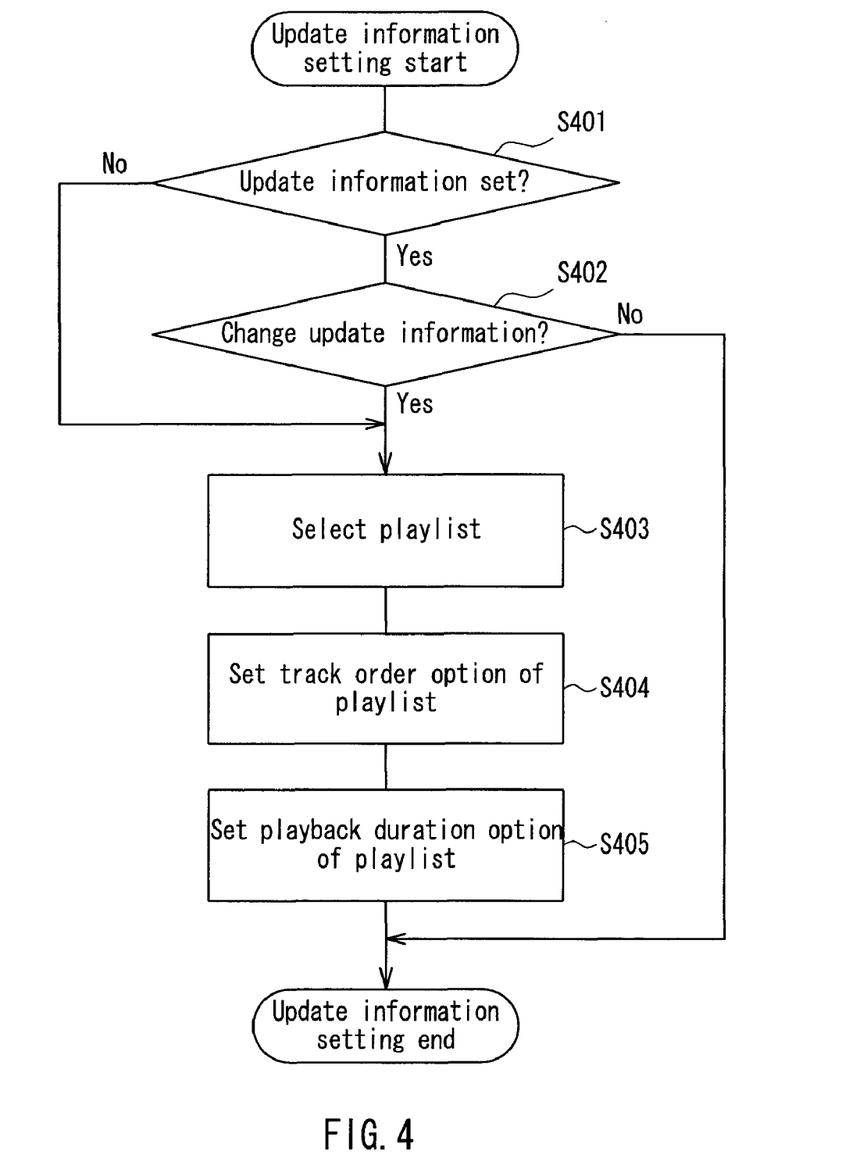
FIG. 4 is a flowchart showing update condition setting in the content data update system.

FIG. 4 is a flowchart showing the process of setting update information by the update information setting unit 204 of the content data update system in to the present embodiment. Hereinafter, the procedures of the process for setting update information will be described in accordance with FIG. 4. Note that, hereinafter, the description will refer to the memory card 105 if there is no need to distinguish between the memory cards 105a and 105b.

Figure 7A:
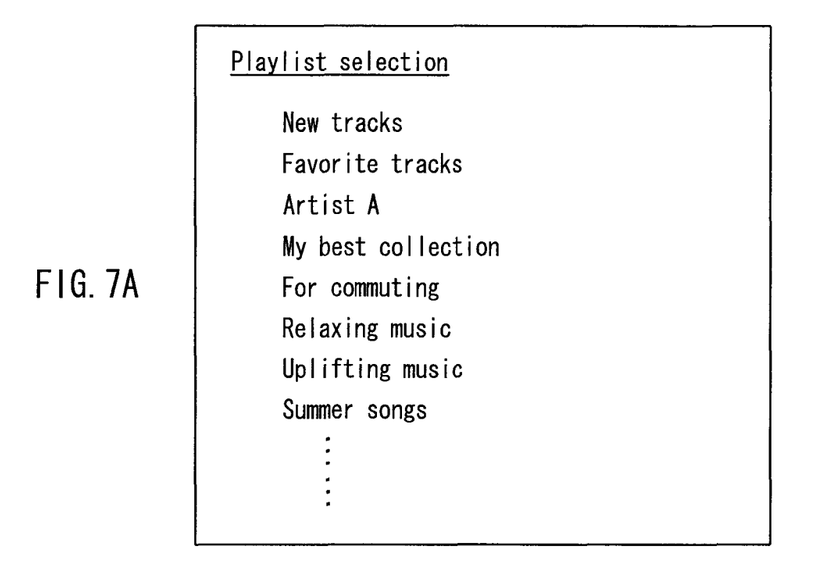
FIG. 7A shows exemplary playlist selection in the update condition setting of the content data update system.

When the memory card 105 is connected to the content data storage apparatus 101 and the user operates the update information setting switch 303, the update information setting unit 204, at step S401, judges whether update information (playlist name for updating, update conditions) already has been set in the update information storage area 207 of the memory card 105. If update information has already been set, the user, in step S402, can select whether to change the settings. If "no change" is selected in step S402, the process of setting update information (changing update information) of steps S403 to S405 is not performed. On the other hand, if "change" is selected in step S402, or if update information has not yet been set in the update information storage area 207 of the memory card 105, selection of a playlist for updating is accepted at step S403. At this time, the update information setting unit 204 extracts the playlist names registered in the playlist data area 202 of the content data storage apparatus 101, and displays a list of these playlist names on the display 304, as shown in FIG. 7A.

Next, update conditions for updating data on the memory card 105 are set. In the present embodiment, an example is given in which a playlist track order option and a playlist playback duration option are set as update conditions. The update conditions are, however, not limited to only these specific examples, and can be set arbitrarily.

Figure 7B:
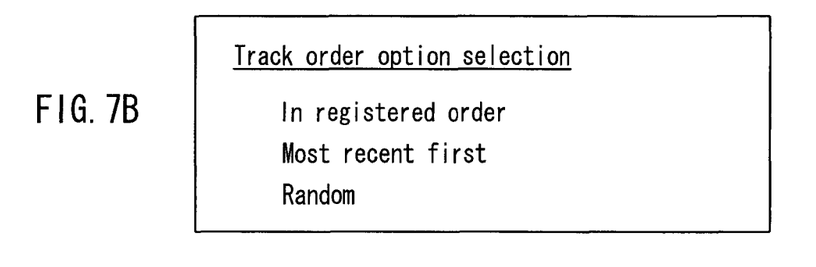
FIG. 7B shows exemplary track order option selection in the update condition setting of the content data update system.

Firstly, at step S404, the track order option of the playlist for updating is set. That is, when the memory card 105 is updated, the playlist will be organized in accordance with the track order set here. The update information setting unit 204 displays a list of track order option selections on the display 304, as shown in FIG. 7B, for example. In this example, the user can select the track order option from the three alternatives "In registered order", "Most recent first" and "Random". The selected track order is stored in the update information storage area 207. Here, when "In registered order" is selected, the update execution unit 205, when updating the content data, organizes the playlist so that tracks in the playlist are in the order in which they were registered in the content data storage apparatus 101. When "Most recent first" is selected, the playlist is organized opposite to "In registered order", so that tracks in the playlist are in descending order of the time at which they were registered in the content data storage apparatus 101. With "Random", the track order is determined by random numbers whenever updating is performed, regardless of the order in which the tracks were registered in the content data storage apparatus 101. Note that although the user selects the track order option from these alternatives in the present embodiment, a configuration enabling the user to set the track order arbitrarily is also possible.

Figure 7C:
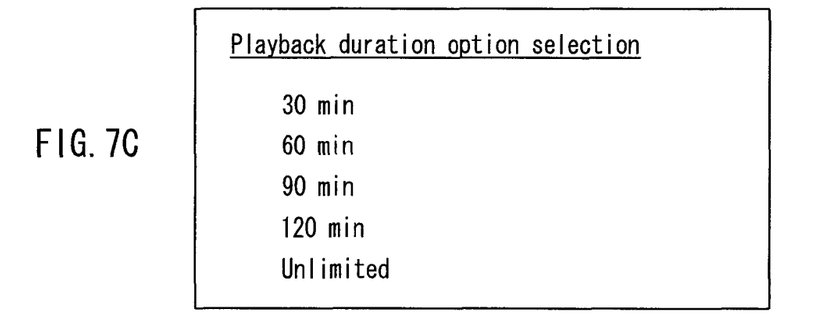
FIG. 7C shows exemplary playlist playback duration option selection in the update condition setting of the content data update system.

Next, at step S405, the playback duration option of the playlist created when updating the content data of the memory card 105 is set. Here, the update information setting unit 204 displays a list of playback duration option selections on the display 304, as shown in FIG. 7C, for example. In the FIG. 7C example, the user can select playback durations of "30 min", "60 min", "90 min", "120 min" and "Unlimited". The selected playback duration is stored in the update information storage area 207. When updating the content data, the update execution unit 205 will organize the playlist so as not to exceed the playback duration selected here. For example, assume that in the case where the user has selected "30 min" as the playback duration option of a given playlist for updating, content data whose total playback duration equates to 30 minutes or more is stored as the content data of the playlist in the content data area 203 of the content data storage apparatus 101. In this case, the update execution unit 205 will select content data so as to be in the track order selected as the track order option and not to exceed the playback duration selected as the playback duration option from the content data in the content data area 203, and write the selected content data to the content data area 209 of the memory card 105. The playlist will be organized in accordance with the selection result, and registered in the playlist data area 208 of the memory card 105. Note that the playback duration option is also not limited to selecting from alternatives, with a configuration enabling the user to freely set the playback duration also being possible.

Figure 5:
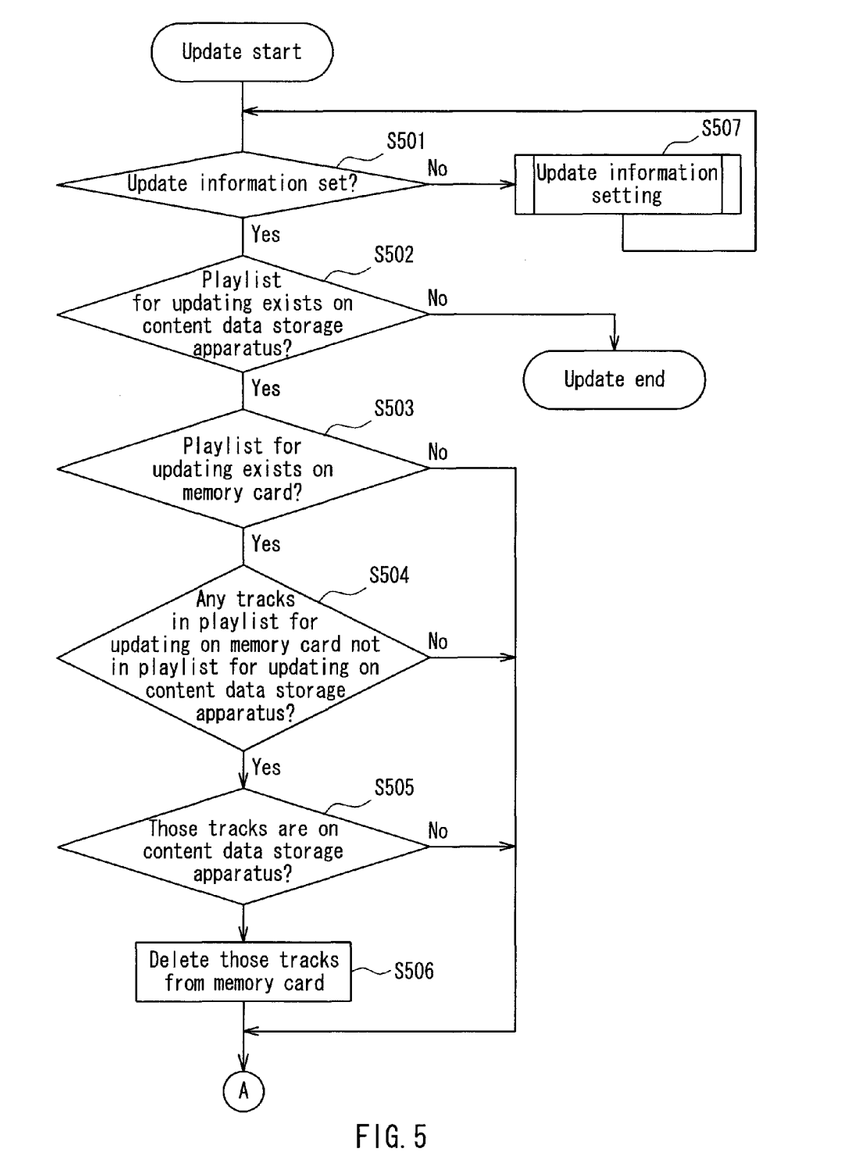
FIG. 5 is a flowchart showing update execution in the content data update system.
Figure 6:
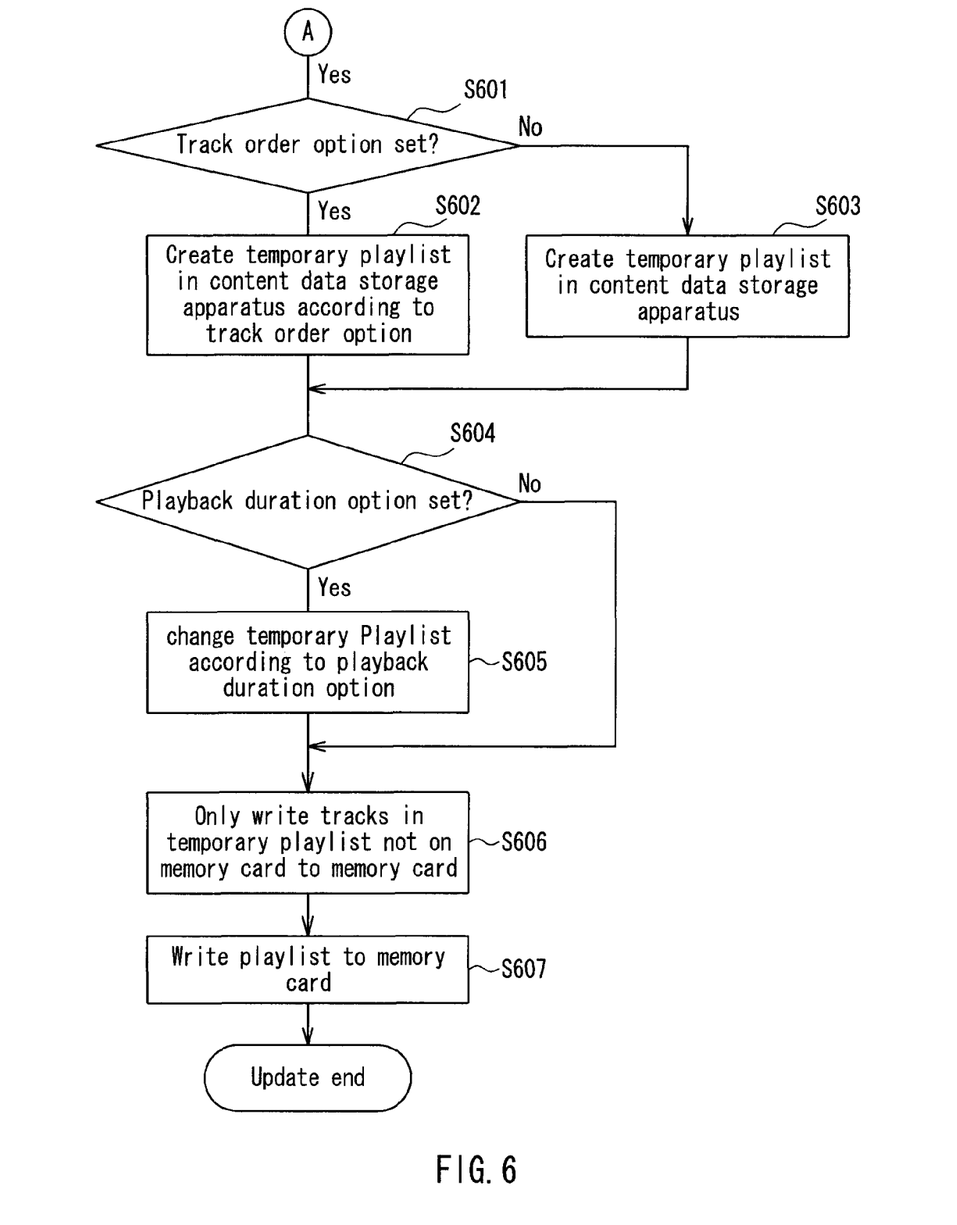
FIG. 6 is a flowchart showing update execution in the content data update system.

FIGS. 5 and 6 are flowcharts showing the update execution process of the content data update system in the present embodiment. Update execution will be described in accordance with FIGS. 5 and 6. When the memory card 105 is connected to the content data storage apparatus 101 and the user operates the update execution switch 302, the update execution unit 205, at step S501, checks whether update information is set in the update information storage area 207 of the memory card 105. If, at step S501, there are no update conditions in the update information storage area 207 of the memory card 105, the update information setting process of FIG. 4 is called (step S507).

On the other hand, if, at step S501, update information is stored in the update information storage area 207 of the memory card 105, the update execution unit 205 reads a playlist name for updating stored as one piece of update information. Then, the update execution unit 205, at step S502, judges whether a playlist name matching the playlist name read at step S501 exists in the playlist data area 202 of the content data storage apparatus 101, and ends update execution if a matching playlist name does not exist.

On the other hand, if, at step S502, a playlist name matching the playlist name read at step S501 exists in the playlist data area 202, the update execution unit 205, at step S503, judges whether playlist data assigned this playlist name exists in the playlist data area 208 of the memory card 105. If judged to exist, the update execution unit 205, at step S504, compares the playlist data recorded in the playlist data area 208 of the memory card 105 with the playlist data recorded in the playlist data area 202 of the content data storage apparatus 101.

Then, if, at step S504, there is track data registered in the playlist of the memory card 105 that is not in the playlist of the content data storage apparatus 101, the update execution unit 205, at step S505, judges whether this track data is in the content data area 203 of the content data storage apparatus 101. If the judgment result of step S505 is YES, the update execution unit 205, at step S506, deletes this content data from the content data area 209 of the memory card 105. Note that this track data is not deleted from the content data area 203 of the content data storage apparatus 101. If the judgment result of step S505 is NO, the processing of step S506 is bypassed. That is, the fact that the track data is not in the content data area 203 of the content data storage apparatus 101 judgment result of step S505 is NO) means that this track data has been imported to the memory card 105 by some means or other from the same type of apparatus as the content data storage apparatus 101 or from another apparatus of some sort, and there is also a possibility that a backup does not exist. If such track data is deleted from the memory card 105, the track data will be lost forever if there is no backup. In view of this, if the judgment result of step S505 is NO, the processing of step S506 is bypassed in order to preserve this track data.

Next, at step S601 in FIG. 6, the update execution unit 205 checks whether the track order option is set in the update information storage area 207 of the memory card 105. If the track order option is set, the update execution unit 205, at step S602, creates a temporary playlist for writing to the memory card, according to the set track order, based on the playlist data stored in the playlist data area 202. The temporary playlist is created temporarily in the content data storage apparatus 101, in a memory that is accessible by the update execution unit 205. For example, if the track order option is "Random", the update execution unit 205 creates a temporary playlist by randomly rearranging the order of the track data of the playlist data stored in the playlist data area 202. Again, if the track order option is "In registered order", for example, the update execution unit 205 creates a temporary playlist by arranging the track data in the order in which it is registered in the playlist data stored in the playlist data area 202. On the other hand, if the track order option has not been set, the update execution unit 205, at step S603, creates a temporary list so that the track data is arranged in a prescribed order. Note that if the track order option has not been set, the decision in step S603 as to what track order to create the temporary playlist can be set arbitrarily using the default settings of the apparatus or the like. For example, in step S603, the temporary playlist may be created so that the track data is in the same order as the playlist stored in the playlist data area 202, or in random order or in order of the most recent first.

Next, at step S604, the update execution unit 205 checks whether the playback duration option is set in the update information storage area 207 of the memory card 105. If the playback duration option is set, the update execution unit 205 calculates the total playback duration in accordance with the track order of the temporary playlist, and if the total exceeds the set duration, the excess tracks are deleted from the temporary playlist (step S605). If the playback duration option has not been set, the processing of step S605 is bypassed.

Next, in step S606, the update execution unit 205 extracts track data included in the temporary playlist that is not on the memory card 105 from the content data area 203, and writes the extracted track data to the memory card. Next, the update execution unit 205, at step S607, writes the temporary playlist to the playlist data area 208 of the memory card 105. This completes the update process.

Note that although the update process is started by the user operation of the update execution switch 302 in the present embodiment, the update process alternatively may be started automatically, triggered by connection of the memory card 105 to the content data storage apparatus 101.

Figure 8A:
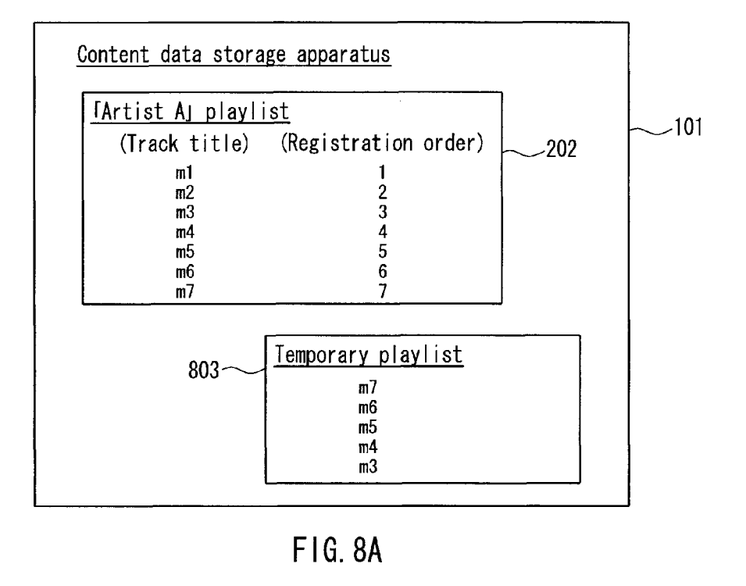
FIG. 8A shows exemplary data stored in a content data storage apparatus 101.

Here, the update execution process will be described in detail, in accordance with FIGS. 8A to 8C. FIG. 8A shows exemplary data stored in the content data storage apparatus 101, FIG. 8B shows an exemplary memory card before updating content data, and FIG. 8C shows an exemplary memory card after updating content data.

Figure 8B:
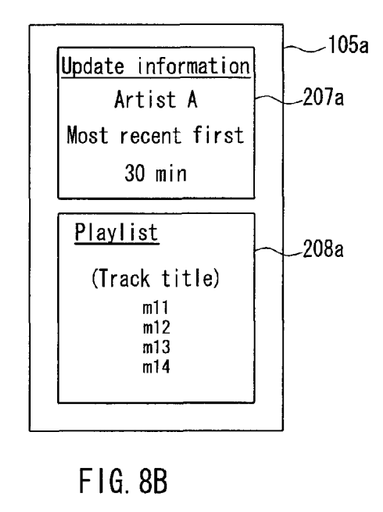
FIG. 8B shows an exemplary memory card before updating content data.
Figure 8C:
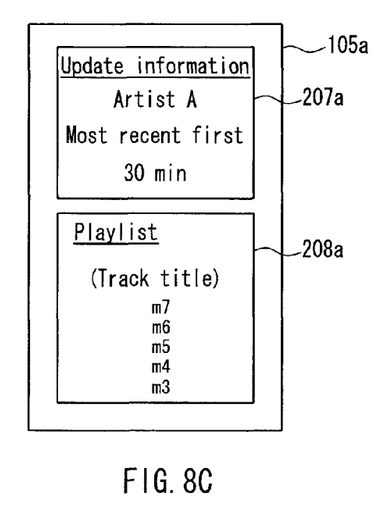
FIG. 8C shows an exemplary memory card after updating content data.

In the FIG. 8B example, playlist data assigned the playlist name "Playlist A" and content data (not shown) included in this playlist are assumed to exist in the memory card 105*a*. In the memory card 105*a*, the playlist name "Artist A" for updating is assumed to be set in the update information storage area 207*a* as update information, together with the track order option "Most recent first" and the playback duration option "30 min" as update conditions, as shown in FIG. 8B. Also, the four tracks m11 to m14 are assumed to be registered in the playlist data area 208*a* of the memory card 105*a*, as shown in FIG. 8B. In the "Artist A" playlist of the content data storage apparatus 101, playlist data that includes the seven tracks m1 to m7 is assumed to now be registered in the playlist data area 202, as schematically shown in FIG. 8A. These tracks are ordered from the earliest registered track down, as shown in FIG. 8A.

Here, in the case of updating the memory card 105*a* using the update information in the update information storage area 207*a*, the update execution unit 205 judges whether a playlist name matching "Artist A" set as the playlist name for updating exists in the playlist data area 202 of the content data storage apparatus 101. In the FIG. 8A example, a playlist entitled "Artist A" does exist, so the update execution unit 205 creates a temporary playlist 803 based on the "Artist A" playlist.

Here, since the track order option set as an update condition is "Most recent first", the update execution unit 205 creates the temporary playlist 803 by arranging the tracks included in the "Artist A" playlist in order of the most recent first. As seen from FIG. 8A, the temporary playlist 803 created in accordance with the "Most recent first" track order option has the most recently registered tracks first. Further, the playback duration option is set to "30 min", so the update execution unit 205 calculates the total playback duration starting from track 1 "m7" in the temporary playlist 803, and deletes tracks that exceed a total of 30 minutes from the temporary playlist 803. Note that while not shown in the drawings, data relating to the playback duration of each track also is included in the playlist data. As a result, it is assumed that the five tracks m7, m6, m5, m4, and m3 are registered in the temporary playlist 803, as shown in FIG. 8A. That is, the total playback duration of these five tracks is within 30 minutes, which would be exceeded if the playback duration of m2 further was added.

Next, the update execution unit 205 writes the temporary playlist 803 to the playlist data area 208*a* of the memory card 105*a*. Further, the update execution unit 205 extracts the data of those tracks included in the temporary playlist 803 that do not exist in the content data area 209*a* of the memory card 105*a* from the content data area 203 of the hard disk 102, and writes the extracted data to the content data area 209*a* of the memory card 105*a*. The updated "Artist A" playlist on the memory card 105*a* resulting from this processing is as shown in FIG. 8C.

As described above, the content data update system in the present embodiment includes a client apparatus that uses content data, and a content data storage apparatus that updates the content data of the client apparatus based on stored content data. The content data storage apparatus has a storage content storage medium capable of storing plural groupings of content data in association with storage content management information for managing a set of the content data and storage content identification information for identifying the content data in management units, an input/output unit that performs data input/output with the client apparatus, and a control unit that updates the content data of the client apparatus, and the client apparatus has a client content storage medium that stores content data used by the client apparatus in association with client content management information for managing the content data and client content identification information for identifying the content data in management units. The control unit of the content data storage apparatus acquires the client content identification information of content data in one or a plurality of management units specified for updating out of the content data of a client apparatus connected to the input/output unit, and, if storage content identification information matching the acquired client content identification information is stored in the storage content storage medium, updates the content data of the client apparatus based on content data included in management units identified by the storage content identification information that matches the client content identification information. As a result of having the above configuration, the content data update system of the present embodiment is able to use a single content data storage apparatus to update the content data of a plurality of client apparatuses individually according to the preferences or the like of users, based on respective pieces of update information held for each client apparatus.

As aforementioned, the memory card 105 also can be updated by other content data storage apparatuses, as a result of holding update information in the memory card 105. For example, assume that a user A has created a playlist that brings together his or her favorite tracks using the content data storage apparatus 101 and attached the playlist name "My Best Selection", and that this playlist has been registered in the memory card 105. Then, assume that the memory card 105 is loaded in a content data storage apparatus (same type as content data storage apparatus 101) owned by user A's friend, user B. Here, if a playlist entitled "My Best Selection" exists in user B's content data storage apparatus, this playlist and corresponding content data is downloaded to the memory card 105 to an extent that meets the update conditions. User A is thus able to readily listen to tracks recommended by user B, that is, content data registered in the playlist entitled "My Best Selection" that exists on the content data storage apparatus owned by user B. Note that in this case, content data originally recorded on user A's memory card 105 but not existing on user B's content data storage apparatus is held on the memory card 105 without being deleted, as described at steps S505 and S506 of FIG. 5. The memory card 105 thus also can be used commonly in a plurality of the content data storage apparatuses.

The present embodiment enables a track order option to be set as an update condition. Thus, if "Most recent first" is selected as the track order option, for example, new tracks registered in the content data storage apparatus 101 can automatically be updated to the memory card 105.

Also, the present embodiment enables a playback duration option to be set as an update condition. Playlists thus can be created in the memory card 105 to match commuting time to work or school, for example, and updated to the memory card 105.

Note that in the present embodiment, the update information is held in the update information storage area 207 of the memory card 105. However, the update information may be held in the content data storage apparatus 101. In this case, the content data storage apparatus 101 holds identifiers uniquely allocated to each memory card (i.e., memory card 105*a*, 105*b*, etc.) for identifying these memory cards, and stores update information for respective memory cards 105*a*, 105*b*, etc. in association with these identifiers. In this case, when one of these memory cards 105*a*, 105*b*, etc. is connected to the content data storage apparatus 101 in order to update content data, the control unit 103 of the content data storage apparatus 101 reads the identifier of the connected memory card via the IO unit 104, and updates the content data of the connected memory card 105 based on stored update information corresponding to the read identifier.

While an example is given in the present embodiment in which a single playlist is selected for updating, a configuration enabling a plurality of playlists to be selected is also possible. In this case, a playlist that includes, for example, tracks commonly included in the plurality of playlists (product set) or tracks included in one of the plurality of playlists (sum set) may be created as a temporary playlist, and written to the memory card 105 as a combination of the plurality of selected playlists.

Note that although the above description illustrates an example in which content data for updating is identified with playlist names, content data may be selected by searching with an arbitrary keyword.

Note that although a track order option and a playback duration option are illustrated as exemplary update conditions in the above description, the number and type of update conditions is arbitrary. The way of combining conditions (AND condition, OR condition) is also arbitrary. For example, a condition also can be set that specifies tracks included in a given playlist that have been recently recorded, for example.

The present invention is useful as a content data storage apparatus and a content data update system capable of individually updating content data on a plurality of client apparatuses according to the preferences or the like of users of the individual client apparatuses.

While the present invention has been described above together with a specific embodiment thereof, the scope of the invention is not limited to the foregoing embodiment, and it will be apparent to those skilled in the art that numerous other adaptations, changes and modifications may be made without departing from the spirit of the invention as set forth in the appended claims.

What is claimed is:

1. A content data storage apparatus for storing content data, and extracting the stored content data to update content data on a client apparatus, comprising:
 a storage content storage medium capable of storing plural groupings of the content data in association with storage content management information for managing a set of the content data and storage content identification information for identifying a group including one or a plurality of the content data;
 an input/output unit that performs data input/output with the client apparatus;
 a control unit that updates the content data of the client apparatus; and
 an operation unit that receives an input operation by a user, wherein the content data of the client apparatus is stored on the client apparatus in association with client content management information for managing the content data and client content identification information for identifying the content data in management units, the operation unit is capable of specifying content data for updating out of the content data on the client apparatus connected to the input/output unit, and when the control unit receives an input operation for specifying content data for updating, the control unit acquires the client content identification information of content data contained in one or a plurality of groups specified for updating out of the content data of a client apparatus connected to the input/output unit, and, if storage content identification information matching the acquired client content identification information is stored in the storage content storage medium, updates the content data of the client apparatus based on content data included in management units identified by the storage content identification information that matches the client content identification information.

2. The content data storage apparatus according to claim 1, wherein update information that includes the client content identification information of content data in one or a plurality of management units specified for updating out of the content data of a client apparatus is held in the client apparatus, and the control unit acquires the client content identification information included in the update information from a client apparatus connected to the input/output unit, via the input/output unit.

3. The content data storage apparatus according to claim 1, further comprising an update information storage unit that stores update information that includes the client content identification information of content data in one or a plurality of management units specified for updating out of the content data of a client apparatus, and an identifier unique to the client apparatus using the content data, wherein the control unit acquires the identifier of a client apparatus connected to the input/output unit from the client apparatus via the input/output unit, and acquires the client content identification information corresponding to the acquired identifier from the update information storage unit.

4. The content data storage apparatus according to claim 2, wherein the update information further includes an update condition of content data in one or a plurality of management units specified for updating, and the control unit updates the content data of the client apparatus, based on content data included in management units identified by the storage content identification information that matches the client content identification information, and the update condition.

5. The content data storage apparatus according to claim 2, further comprising an operation input unit for allowing a user to set the update information.

6. The content data storage apparatus according to claim 1, wherein if content data in a plurality of management units is specified as content data for updating, the control unit updates the content data of the client apparatus, based on a sum set of content data in a plurality of management units identified by storage content identification information that matches the client content identification information of the content data in the plurality of management units.

7. The content data storage apparatus according to claim 1, wherein if content data in a plurality of management units is specified as content data for updating, the control unit updates the content data of the client apparatus, based on a product set of content data in a plurality of management units identified by storage content identification information that matches the client content identification information of the content data in the plurality of management units.

8. The content data storage apparatus according to claim 1, wherein if there is content data in the client content management information that is not included in the storage content management information and not stored in the storage content storage medium, the control unit maintains the content data without deletion from the client apparatus.

9. A content data update system comprising a client apparatus that uses content data, and a content data storage apparatus that updates the content data of the client apparatus based on stored content data, wherein the content data storage apparatus includes:

a storage content storage medium capable of storing plural groupings of content data in association with storage content management information for managing a set of the content data and storage content identification information for identifying the content data in management units;

an input/output unit that performs data input/output with the client apparatus; and a control unit that updates the content data of the client apparatus, the client apparatus includes:

a client content storage medium that stores content data used by the client apparatus in association with client content management information for managing the content data and client content identification information for identifying the content data in management units, and the control unit of the content data storage apparatus acquires the client content identification information of content data in one or a plurality of management units specified for updating out of the content data of a client apparatus connected to the input/output unit, and, if storage content identification information matching the acquired client content identification information is stored in the storage content storage medium, updates the content data of the client apparatus based on content data included in management units identified by the storage content identification information that matches the client content identification information.

10. A content data storage method for updating content data on a client apparatus that uses the content data, based on content data stored in a content data storage apparatus, comprising the steps of:

storing the content data used by the client apparatus on a client content storage medium of the client apparatus in association with client content management information for managing the content data and client content identification information for identifying the content data in management units;

storing plural groupings of content data on a storage content storage medium of the content data storage apparatus in association with storage content management information for managing a set of the content data and storage content identification information for identifying the content data in management units;

acquiring the client content identification information of content data in one or a plurality of management units specified for updating out of the content data of a client apparatus connected to the content data storage apparatus; and updating, if storage content identification information matching the acquired client content identification information is stored in the storage content storage medium, the content data of the client apparatus based on content data included in management units identified by the storage content identification information that matches the client content identification information.

* * * * *